(12) United States Patent
Meller et al.

(10) Patent No.: US 7,599,970 B2
(45) Date of Patent: Oct. 6, 2009

(54) METHOD AND APPARATUS FOR UPDATING A STORED VERSION OF CONTENT STORED IN A STORAGE DEVICE

(75) Inventors: Evyatar Meller, Petach-Tikva (IL); Sharon Peleg, Ramat Hasharon (IL)

(73) Assignee: Red Bend Ltd., Hod Hasharon (IL)

( * ) Notice: Subject to any disclaimer, the term of this patent is extended or adjusted under 35 U.S.C. 154(b) by 81 days.

(21) Appl. No.: 11/079,910

(22) Filed: Mar. 15, 2005

(65) Prior Publication Data
US 2005/0216530 A1   Sep. 29, 2005

Related U.S. Application Data

(60) Provisional application No. 60/552,706, filed on Mar. 15, 2004.

(51) Int. Cl.
*G06F 12/00* (2006.01)
(52) U.S. Cl. .................................. 707/203; 707/204
(58) Field of Classification Search ................ 707/203, 707/10, 200, 201, 202, 205, 204
See application file for complete search history.

(56) References Cited

U.S. PATENT DOCUMENTS

| 6,546,552 | B1 | 4/2003 | Peleg |
| 6,832,373 | B2 | 12/2004 | O'Neill |
| 6,836,657 | B2* | 12/2004 | Ji et al. ................ 455/419 |
| 7,082,549 | B2* | 7/2006 | Rao et al. .................. 714/6 |
| 2003/0188303 | A1 | 10/2003 | Barman et al. |
| 2004/0133849 | A1* | 7/2004 | Goger .................... 715/500 |
| 2004/0215755 | A1* | 10/2004 | O'Neill .................... 709/223 |
| 2005/0085222 | A1* | 4/2005 | Przybilski et al. .......... 455/418 |

FOREIGN PATENT DOCUMENTS

| EP | 0 918 287 A | 11/1998 |
| WO | WO 02/41147 A | 5/2002 |
| WO | WO 2004/114130 | 12/2004 |
| WO | WO 2005/003963 | 1/2005 |

OTHER PUBLICATIONS

Anonymous "Logging Status Information While Installing New Software" IBM Technical Disclosure Bulletin, IBM Corp. New York, US, vol. 34, No. 1, Jun. 1991, p. 177.

* cited by examiner

*Primary Examiner*—Hosain T Alam
*Assistant Examiner*—Amy Ng
(74) *Attorney, Agent, or Firm*—The Law Office of Michael E. Kondoudis

(57) ABSTRACT

A method and an apparatus for updating a stored version of content stored in a storage device to an updated version using an update package. The update package is adapted for updating an original version of content to the updated version. In addition updating is carried out in accordance with an update sequence. A determination is made whether the stored version is the original version or an intermediate version derived therefrom. If the stored version is an intermediate version, a resume location in the stored version is determined, and if the stored version is determined to be an original version or an intermediate version, the update package is used to update the stored version to the updated version starting from the resume location.

19 Claims, 11 Drawing Sheets

METHOD AND APPARATUS FOR UPDATING A STORED VERSION OF CONTENT STORED IN A STORAGE DEVICE

FIELD OF THE INVENTION

This invention relates to updating versions of content stored in a storage device. More specifically, the invention relates to in-place updating versions of content.

BACKGROUND OF THE INVENTION

Sometimes it is required to update content stored in a storage device. For example, if the content is a software (such as an executable file), it is sometimes required to upgrade the software. However, it should be noted that sometimes other types of content also require updates, such as text or data stored in a database etc. Hereinafter the term "old version" or "original version" refers to content before update, the term "new version" or "updated version" refers to the content after it was updated. An "update package", sometimes referred to also as a "difference", a "difference result" or a "delta", includes data provided as input for an update process, wherein the update process updates the old version to the new version in accordance with the update package.

There are several ways known in the art for generating update packages and using them for updating versions. For example, U.S. Pat. No. 6,546,552 ("Difference extraction between two versions of data-tables containing intra-references", published 2003) discloses a method for generating a compact difference result between an old program and a new program. Each program includes reference entries that contain references that refer to other entries in the program. According to the method of U.S. Pat. No. 6,546,552, the old program is scanned and for each reference entry the reference is replaced by a distinct label mark, whereby a modified old program is generated. In addition, according to U.S. Pat. No. 6,546,552, the new program is scanned and for each reference entry the reference is replaced by a distinct label mark, whereby a modified new program is generated. Thus, utilizing directly or indirectly the modified old program and modified new program, the difference result is generated.

WO 2004/114130 ("Method and system for updating versions of content stored in a storage device", published 2004) discloses a system and method for generating a compact update package between an old version of content and a new version of content. The system of WO 2004/114130 includes a conversion element generator for generating a conversion element associated with the old version and new version. It also includes a modified version generator for generating a modified version, and an update package generator for generating the compact update package. The compact update package includes the conversion element and a modified delta based on the modified version and the new version.

WO 2005/003963 ("Method and system for updating versions of content stored in a storage device", published 2005) discloses a system and method for updating versions of content stored in a storage device. The system of WO 2005/003963 includes an update module for obtaining a conversion element and a small delta. It also includes a converted old items generator for generating converted old items by applying the conversion element to items of an old version, a data entries generator for generating data entries based on the modified data entries and on the converted old item, and a new version generator for generating a new version of content by applying the commands and the data entries to the old version.

U.S. Pat. No. 6,832,373 ("System and method for updating and distributing information", published 2004) discloses devices, systems and methods for updating digital information sequences that are comprised by software, devices, and data. In addition, these digital information sequences may be stored and used in various forms, including but not limited to files, memory locations, and/or embedded storage locations. Furthermore, the devices, systems, and methods described in U.S. Pat. No. 6,832,373 provide a developer skilled in the art with an ability to generate update information as needed and, additionally, allow users to proceed through a simplified update path, which is not error-prone, and may be performed more quickly than through the use of technologies existing when U.S. Pat. No. 6,832,373 was filed.

It is known to those versed in the art that content can be stored in a storage device, such as disk or memory, while some storage devices are organized in blocks. Blocks being part of the original version are referred to as "old blocks" or "original blocks", while blocks being part of an updated version are referred to as "new blocks" or "updated blocks". In addition, when updating an original version forming an updated version thereby, the updated version can sometimes use content previously stored in blocks of the original version. That is, the content of updated blocks is sometimes similar to content of original blocks.

Furthermore, available storage devices can have a limited space. Thus, while updating versions in a storage device it is sometimes preferred to store the new version in place of the old version, saving space thereby. Such an update process, where the new version occupies at least some of the space previously occupied by the old version, is referred to, in the art as "in-place update" or "updating in-place".

It should be noted that an update process can process the blocks of the old version in an order which does not necessarily correspond to the sequential order of the blocks within the file. The order in accordance with which blocks of the old version are updated is referred to as an "update sequence" or "update order".

One of the outcomes of in-place updating is that once storage blocks have been updated, the content of at least some of them being part of the original version (i.e., at least part of the original content), is potentially lost. Therefore, once the process of updating has started and after some original blocks are modified to hold updated content (the updated content being part of the updated version), the storage device can store content which is partly original and partly updated version.

In addition, it is known in the art that the old content is sometimes required for the update process, such as in a delta update method. Therefore, if the update process is interrupted through the course of its running, before the creation of the new version is completed and when the stored content (or stored version) is partly old version and partly new version, the in-place update process can not be repeated from start anymore.

In light of the above it is realized that in-place updating can be sensitive to interruptions. When the process of in-place updating tries to resume from the point where it was interrupted (the resume location), it requires information that allows calculation of the location of interruption. After locating the location of interruption the update process may also need to restore other information, which was available to the interrupted process at the time of interruption.

Currently in the art a record referred to hereinafter as "state record" is commonly used for storing results of calculations calculated before the interruption. The results together with the identification of the current updated block form a "state"

of the in-place update process. For example, if the update package is compressed and it is being decompressed on-the-fly during the update process for reading just the necessary parts for updating each old block, and were the amount of data decompressed from the update package depends on old contents of updated blocks, than this amount can not be re-computed again once blocks were actually updated.

As mentioned already above, the process can not restart from its beginning. Therefore it might be that some of the data in the state record can not be re-computed even if the last updated record is known—it needs to be restored by other means. The common practice in the prior art is to maintain a state-record as mentioned above in a storage device accessible to the update process, and to update it periodically during the update process, to reflect its progress, an operation referred to hereinafter as "state recording". Using state recording enables the resumption of an in-place update process by re-constructing the state of the process as it was at the last successful update operation, and to continue the process towards its completion.

In some cases, the information stored during state recording can not be part of the contents being updated and must be separated to another area of storage. State recording takes time since it involves read & write operations from and to the storage device. In some case, where the read & write operations of the storage device are allowed only for whole blocks, the time required for the whole process is doubled—for each updated block there is another block to update—the one holding the states recording.

It is also known to those versed in the art that in order to properly resume an interrupted in-place update process there may also be the need to handle a corrupted block which was the result of an interrupted storage write operation. It could be impossible to restore the information in that block, as the block's old content was modified and there may be no way to restore its old content just by examining the file's other blocks. This problem is resolved by the prior art by using a backup buffer where any block's new content is being stored there first and than copying its content to its target block to be updated (hereinafter referred as "update-first") or alternatively, the old block is copied to a backup buffer and afterwards the new content is generated and stored in its target block (hereinafter referred as "backup-first"). This method is also known in the art as "2-phase commit" scheme.

Updating software of embedded devices such as mobile telephones is an example for an in-place update procedure. It is realized that storage of mobile telephones can be limited. For example, a mobile telephone can have enough storage to hold only one version of its software (also called firmware). Maintaining state-recording inside blocks of the firmware itself is clearly not practical since it would interfere heavily with the process of creating the software and therefore it must be stored in a separate area of storage. Updating mobile phone's firmware is a relatively slow process due to the speed of the storage devices used (Flash memory). During the update process the phone is inoperable, creating the need to minimize the time it takes.

There is a need in the art for faster and reliable updating procedures, allowing shorter interruptions in embedded devices operation during software update.

SUMMARY OF THE INVENTION

The present invention provides a method for updating a stored version of content stored in a storage device to an updated version using an update package, wherein the update package is adapted for updating an original version of content to the updated version and wherein the updating is carried out in accordance with an update sequence, the method comprising:
  determining whether the stored version is the original version or an intermediate version derived therefrom;
  if the stored version is an intermediate version, searching for a resume location in said stored version; and
  if the stored version is a determined original version or a determined intermediate version, updating said stored version to said updated version starting from the resume location, using the update package.

The present invention further provides a method for classifying a stored version of content stored in a storage device, the method comprising:
  determining in a non destructive manner whether the content is classified as a member in a group that includes an original version, an updated version, an intermediate version and an alien version.

Yet further the invention provides a method for updating a stored version of content stored in a storage device to an updated version using an update package, wherein the update package is adapted for updating an original version of content to the updated version and wherein the updating is carried out in accordance with an update sequence, the method comprising:
  checking a status information for determining whether the stored version is the original version or an intermediate version derived therefrom;
  if the stored version is an intermediate version, searching for a resume location in said stored version; and
  if the stored version is a determined original version or a determined intermediate version, updating said stored version to said updated version starting from the resume location, using the update package.

The invention provides a method for reliably updating a stored version of content stored in a storage device to an updated version using an update package operative in accordance with an update sequence, the method comprising:
  checking a status information for indicating whether the update package corresponds to the stored version;
  if said status information indicates that the update package corresponds to said stored version, searching for a resume location in said stored version; and
  updating said stored version to said first version starting from the resume location.

The invention further provides an apparatus for updating a stored version of content stored in a storage device to an updated version using an update package, wherein the update package is adapted for updating an original version of content to the updated version and wherein the updating is carried out in accordance with an update sequence, the apparatus comprising:
  a processor;
  a storage device; and
  memory;
  configured to perform the following:
    determining whether the stored version is the original version or an intermediate version derived therefrom;
    if the stored version is an intermediate version, searching for a resume location in said stored version; and
    if the stored version is a determined original version or a determined intermediate version, updating said stored version to said updated version starting from the resume location, using the update package.

Still further the invention provides an apparatus for updating a stored version of content stored in a storage device to an updated version using an update package, wherein the update package is adapted for updating an original version of content to the updated version and wherein the updating is carried out in accordance with an update sequence, the apparatus comprising:
   a processor;
   a storage device; and
   memory;
   configured to perform the following:
   checking a status information for determining whether the stored version is the original version or an intermediate version derived therefrom;
   if the stored version is an intermediate version, searching for a resume location in said stored version; and
   if the stored version is a determined original version or a determined intermediate version, updating said stored version to said updated version starting from the resume location, using the update package.

Yet still further the invention provides an apparatus for classifying a stored version of content stored in a storage device, the apparatus comprising:
   a processor configured to determining in a non destructive manner whether the content is classified as a member in a group that includes an original version, an updated version, an intermediate version and an alien version.

According to one aspect of the invention there is provided a method of allowing resumption of an update process, said update process performing an in-place update of an old version of a file stored on a storage device to form a new version, the old version and the new version including blocks, the method comprising:
   providing signatures to said update process, said signatures being associated with an update package being used by said update process for said in-place update; and
   associating a respective one of said signatures with each block being updated by said update process.

According to another aspect of the invention there is provided a method of resuming an update process, said update process performing an in-place update of an old version of a file stored on a storage device to form a new version, the old version and the new version including blocks, the method comprising:
   computing respective computed signatures for blocks, said computed signatures being characteristic of content stored in said blocks;
   reading respective stored signatures of said blocks; and
   resuming said update process in respect of any blocks for which said stored signature does not match said computed signature.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF EXEMPLARY EMBODIMENTS

Figure 1:
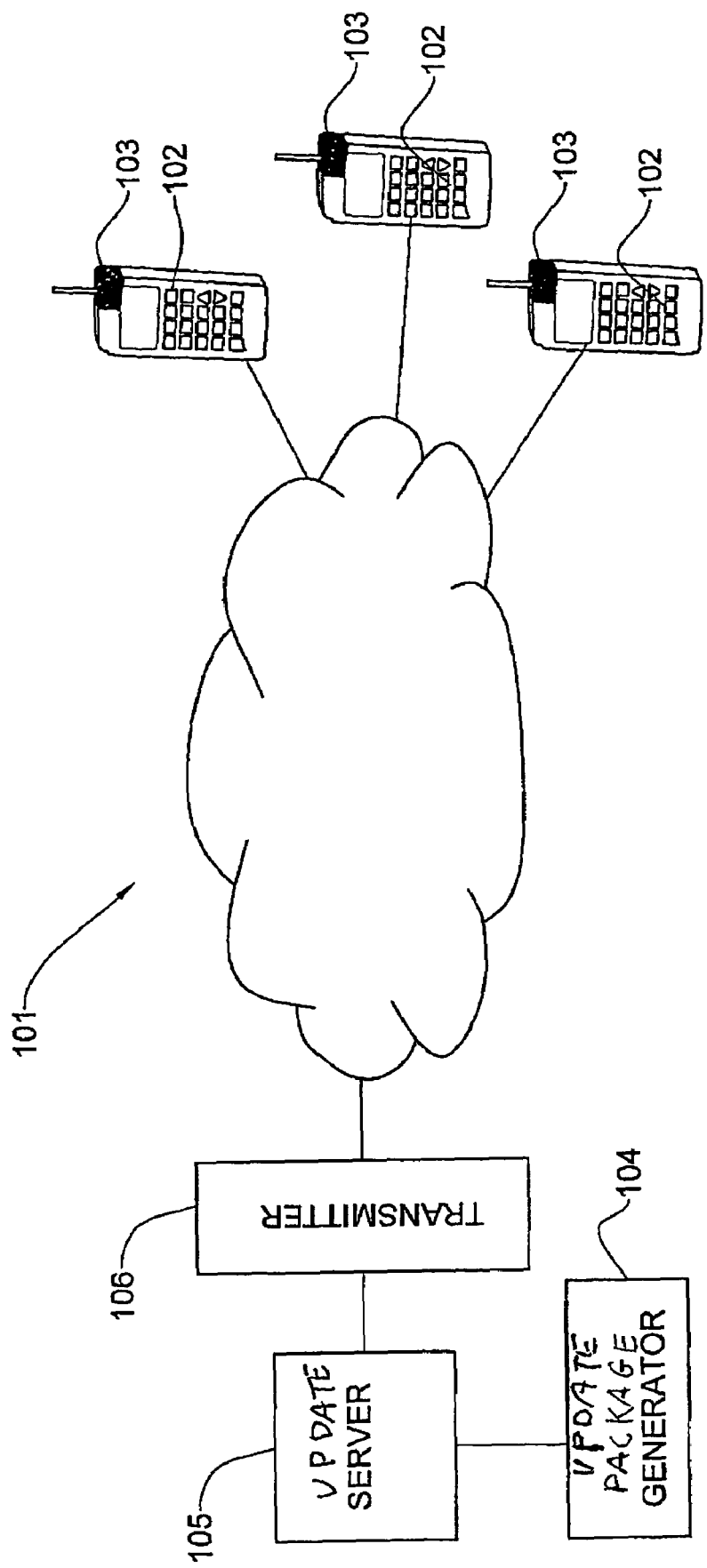
FIG. 1 is a schematic illustration of a system for updating versions in a cellular network, in accordance with one embodiment of the invention.

In the following description components that are common to more than one figure will be referenced by the same reference numerals.

It should be noted that hereinafter, unless specifically noted, the term "update" is used to refer to in-place update.

FIG. 1 is a schematic illustration of a system 101 for updating versions in a cellular network, in accordance with one embodiment of the invention. Cellular telephones 102 that are coupled to or include memory devices 103, execute programs that enable their operation. The version of the program currently executing on the cellular telephones is referred to, hereinafter, as an "old version" or as an "original version". Sometimes there is a need to update the programs in order for the telephones 102 to execute a newer versions thereof. Such an updated version is constructed by an update process executing in the telephone in accordance with an update package.

The update package is generated in an update package generator 104, operating, for example, in a personal computer (PC) or in any other type of computer. The update package is stored in an update server 105 and transmitted, via a transmitter 106 to the cellular telephones 102.

It should be noted that the system 101 illustrated in FIG. 1 is a non-binding example and the invention is not limited to cellular networks or to updating programs. Many other types of content stored in storage devices require update, such as data stored in databases, files stored in the storage device etc. Therefore, hereinafter the term "content" will be used instead of "program".

In the same way, the invention is not limited to cellular telephones 102. It should be appreciated that cellular telephones belong to a group referred to as embedded devices. There are other embedded devices, such as Personal Digital Assistants (PDAs), set-top boxes and other consumer electronic devices that are coupled to storage devices for storing content, and sometimes it is required to update the content stored therein. However, it is possible to update also content stored in storage devices coupled to non-embedded devices, such as PCs or other computers. Furthermore, the storage devices 103 can be, for example, hard-disk drives, Flash-memory devices or any other storage device.

For example, a PC, or any other computer, can store files that include data required for its operation or for operation of programs executing therein (such as "info files" or "dot files" known for those versed in the art). Sometimes it is required to update this data via communications lines, e.g., via the internet or via any other communication mean.

In order to update content stored in the storage devices, update packages are generated, stored in the update server 105 and transmitted to the storage devices or to other devices coupled therewith (such as the cellular telephones 102). Alternatively, it is possible to transmit an update package without storing it first in an update server 105. For example, it is possible to transmit the update package directly from the version generator where it is generated. In such a case the machine where the update generator operates or the update generator itself is considered as the update server 105. In yet a different embodiment the update package generator 104 is not directly coupled with the update server 105. It should be noted that the update server 105 can receive update packages conveyed to it by the update package generator 104, while it can also receive the update packages by any other means such as reading them from a portable storage device (such as disk-on-key, a compact disk or a floppy disk) etc.

When a cellular telephone 105 receives an update package, it can operate an update process in accordance with the update package, wherein the update process updates the original version for generating another version referred to as an "updated version" or as a "new version". It should be noted that the cellular telephone 102 can operate the update process immediately after receiving the update package. Alternatively it can store the update package in a non-volatile memory, such as in the storage device 103, and operate the update process in some later time (such as on the next time the telephone reboots).

Figure 2:
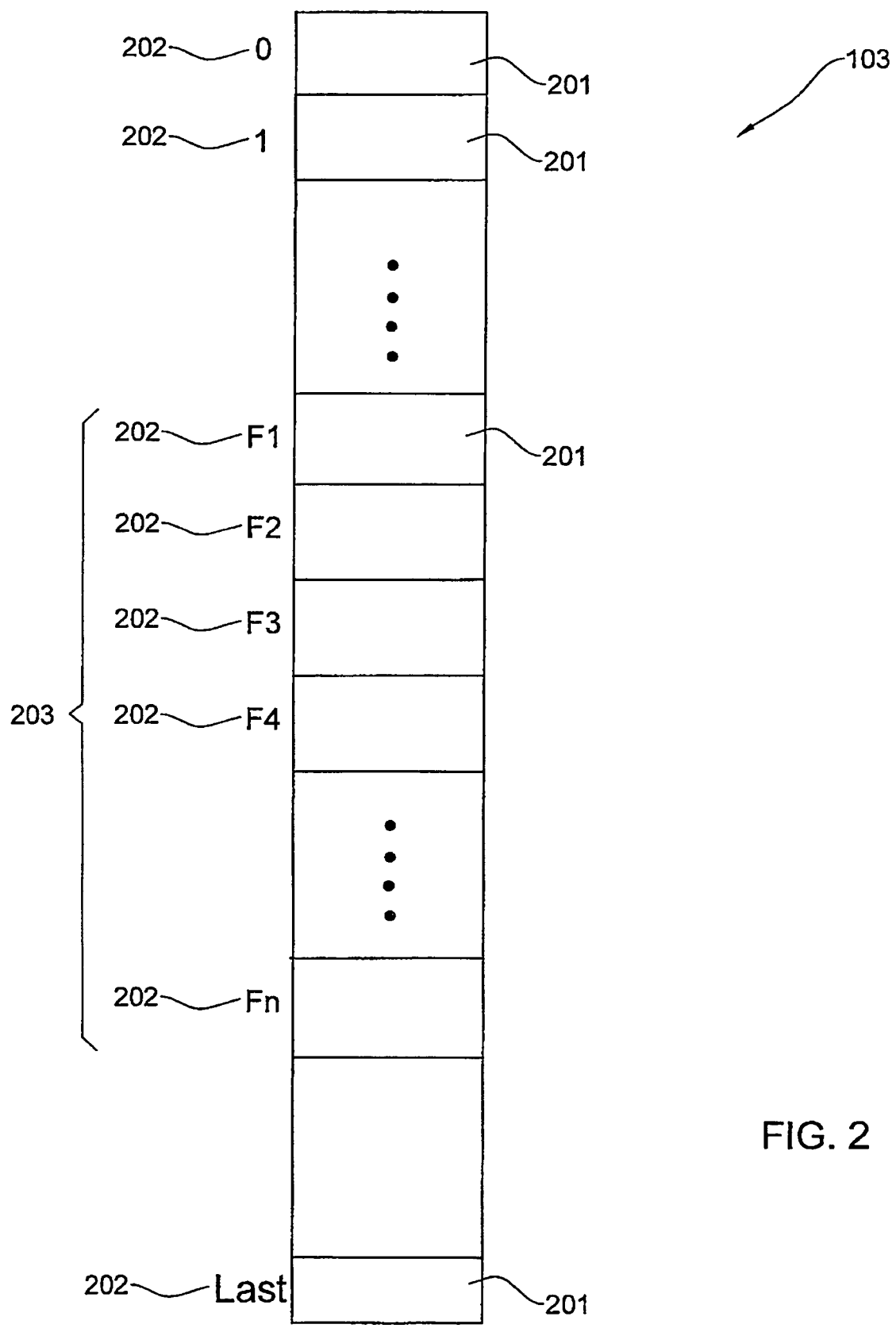
FIG. 2 illustrates blocks in a storage device, according to one embodiment of the invention.

It should be appreciated that many times storage devices 103 are organized in blocks. FIG. 2 illustrates blocks 201 in a storage device 103. According to one embodiment of the invention, each block 201 can have an associated index 202, such as 0, 1, . . . and/or $F_1, F_2, \ldots, F_n$, as illustrated in the figure. The method of indexing is non-binding and any other method, including a combination of several methods is allowed. For example, in an alternative embodiment the address of a block can be used as its index. Indexes can be used for accessing blocks or content stored therein, such as for reading, writing or erasing content.

Stored content can span over one or more blocks, constituting a logical entity, sometimes referred to as a "file". The file need not be stored in whole blocks; rather, it can start at some point along, or in the middle of a block and end somewhere along, or in the middle of another block. In the figure, the blocks marked together by the reference numeral 203 constitute together an exemplary file. It is assumed that in order to update a file the location of the file's content should be given to the update process. The location can be given to it by providing the index of the first block where the file begins (and the location along the block, if required), or it can be computed by the update process, when sufficient data that is required in order to allow such a computation is provided. Furthermore, it is known per se that a file can be constituted of several blocks, two or more of them can be non-sequential blocks, unlike the sequential file 203 illustrated in FIG. 2. For example, a file could associate blocks $F_1, F_4, \ldots, F_n$ (wherein blocks $F_2$ and $F_3$, for example are not part thereof). In addition, files do not need to be organized in an ascending or descending order. A file wherein the blocks are ordered, for example as $F_3, F_1, F_4, \ldots, F_n$ is a legitimate file, although $F_1$ appears to precede block $F_3$ in the storage device.

Figures 3, 4:
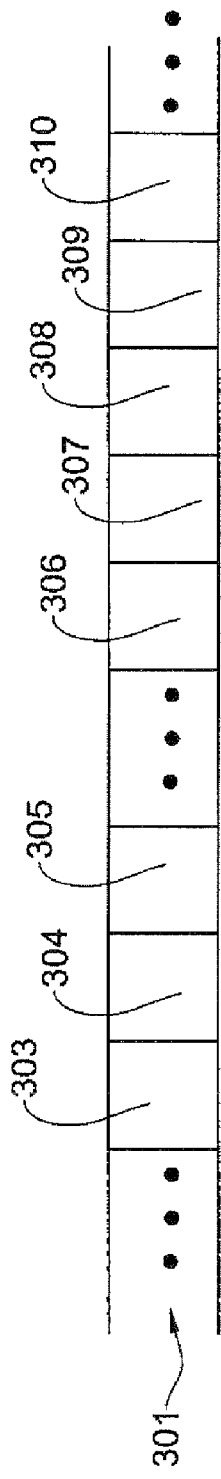
FIG. 3 illustrates a stored file and its respective stored version.
FIG. 4 illustrates an exemplary original version and its respective updated version.

FIG. 3 illustrates a stored file 301 and a corresponding stored version 302. In the figure there are illustrated blocks 303, 304, 305, 306, 307, 308, 309 and 310 in a storage device 103. It is noted that blocks 310, 308, 309, 305, 303, 307, 304 and 306 (in this order) form a file referred to as a "stored file" 301. 302 is an illustration of a stored version corresponding to the stored file. It is illustrated that in the stored version 302 the blocks appear in accordance with their order in the version, however, this order is not necessarily identical to their order as they appear in the storage device 103 (i.e., in the file).

It should noted that FIG. 3 is illustrated by way of example only, and any relation between the blocks in the storage device and the stored version is allowed if applicable. Thus, hereinafter, whenever versions are illustrated, it should be noted that the order of the blocks constituting them has no relation to the order in accordance with which they are stored in the storage device.

FIG. 4 illustrates an exemplary original version 401 and its corresponding updated version 402. The updated version 402 is sometimes referred to also as a "first version" or a "new version". Blocks 403, 404, 405, 406 and 407 constitute together the original version 401, while blocks 408, 409, 410, 411, 412, 413 and 414 constitute together the updated version 402. It is noted that the original version includes fewer blocks compared to the updated version. Thus, the update process inserted new content in to the updated version. In addition, it should be noted that zero or more of the blocks in the new version can be identical to blocks in the updated version, other blocks in the original version are maybe modified, giving rise to blocks in the updated version, while yet other blocks in the old version are deleted thus they may not appear in the new version.

Figure 5:
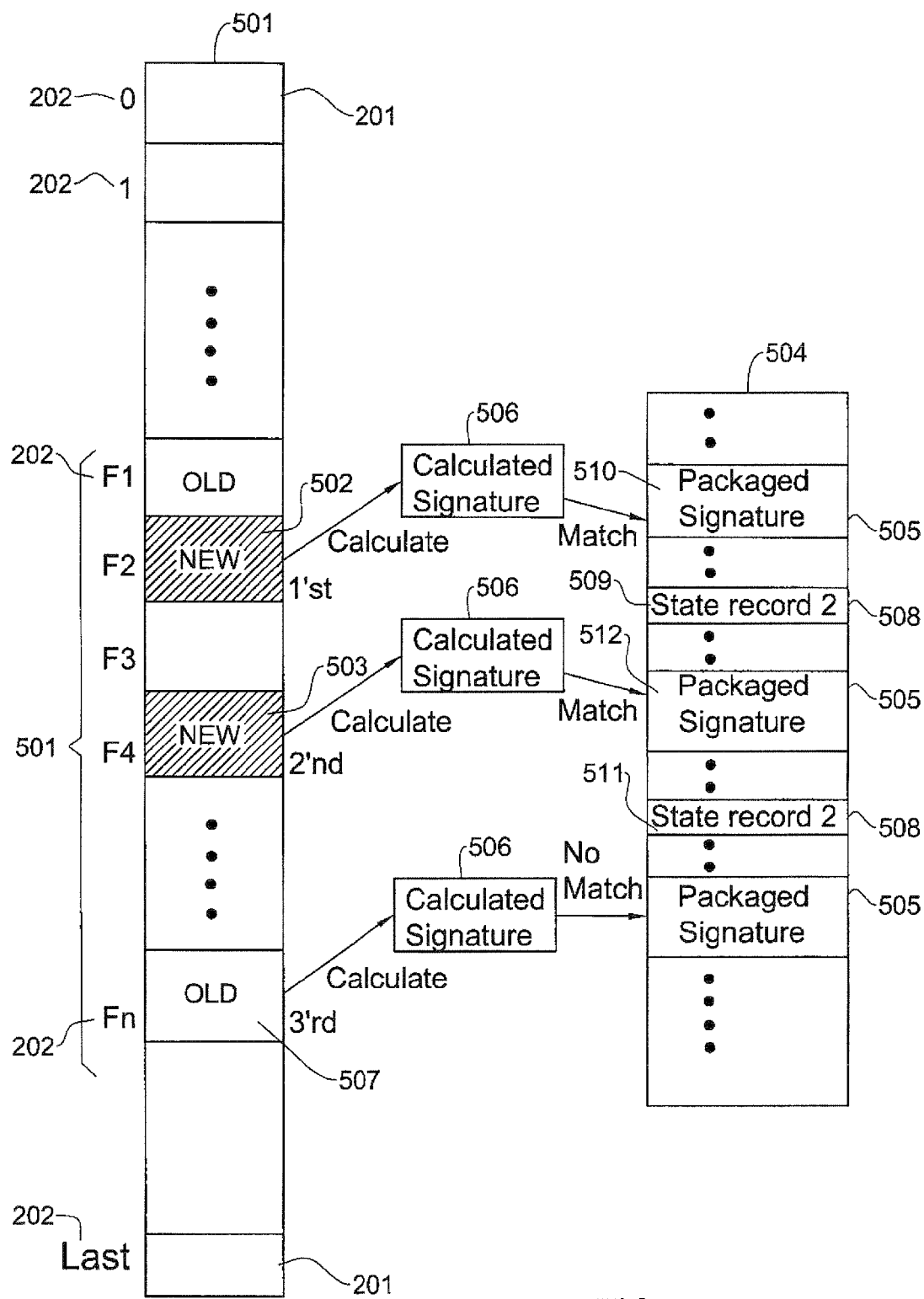
FIG. 5 illustrates an updated version of the file of FIG. 1, according to one embodiment of the invention.

FIG. 5 illustrates an updated file 501 of the file 203 of FIG. 2, according to one embodiment of the invention. It is noted that during the update process several blocks originally included in the original file 203 were modified (therefore constituting "new blocks" or "inserted blocks"). For example, the content of blocks 502 and 503 has changed relative to the original file 203. It is appreciated that the content of the modified blocks 502 and 503 could be provided with an update package used by the update process. Alternatively their content could be computed in accordance with instructions provided therewith. In FIG. 5 an update package 504 is illustrated, wherein the update package 504 includes data for updating the original file 203 to the updated file 501. According to the illustrated embodiment, the update package 504 includes signatures 505 that correspond to modified blocks in the updated version. A signature, for example, can be a known per se checksum computed for the specific block. The signatures can be stored together with their corresponding blocks. However, alternative embodiments are allowed as well, such as storing signatures in the beginning or end of the update package, in separated tables etc. The signatures 505 are referred to, hereinafter, as "packaged signatures".

Usually an update process updates an original version in a gradual process. That is, the update process update one block (which is not necessarily the first block in the version or in the storage device), then it updates a second block etc., until the last block (which is not necessarily the last block in the version or in the storage device) is updated. There may be some embodiments that allow parallel processing, wherein two or more blocks can be updated simultaneously, yet, it is appreciated that updating an original version to an updated version is a gradual process, not an instantaneous process. Realizing this, it should be appreciated that the update process can fail before termination, thus leaving a version that is partly original and partly updated version.

The term "stored version" is used for referring to the version currently stored in the storage device. The stored version can be an original version, it can be an intermediate version, as illustrated, for example, with reference to FIG. 6 below, or it can be an updated version. It is noted that a stored version can also be an "alien version" that does not correspond to the update package. In other words, an update package is adapted for updating a stored version that is an original version or an intermediate version derived therefrom. A stored version that the update package cannot correctly update is referred to as an alien version.

Figure 6:
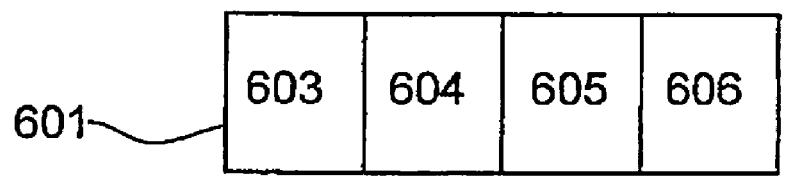
FIG. 6 illustrates simplified exemplary stages in updating an original version to an updated version.
Figure 6:
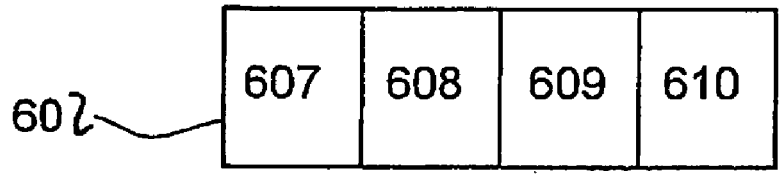
Figure 6:
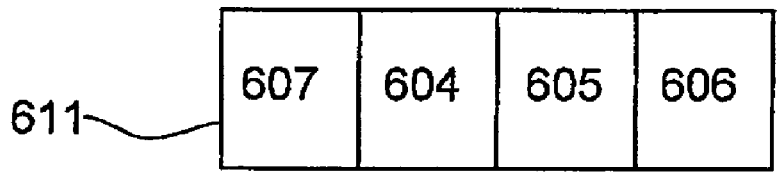
Figure 6:
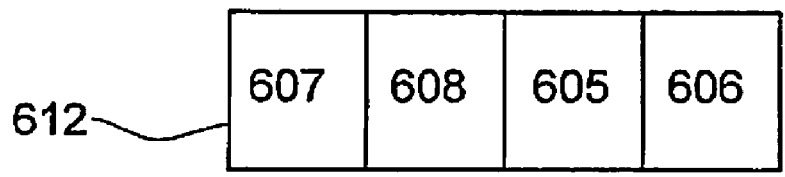
Figure 6:
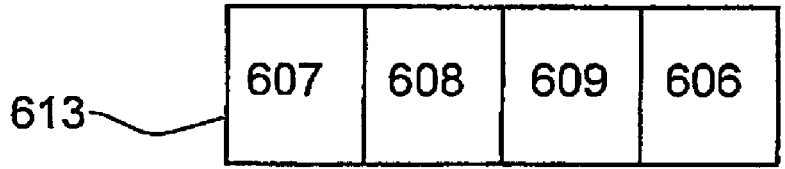

FIG. 6 illustrates simplified exemplary stages in updating an original version 601 to an updated version 602. The original version 601 includes four blocks, namely 603, 604, 605 and 606. The updated version, according to this example, also includes four blocks, namely 607, 608, 609 and 610, wherein block 607 replaces block 603, block 608 replaces block 604, block 609 replaces block 605 and block 610 replaces block 606. According to the example, the update process first replaces block 603 with block 607. Thus, the stored version 611 includes a combination of the original version 601 and the updated version 602, wherein the first block is 607 (which belongs to the updated version) while the other blocks (i.e., 604, 605 and 606) still belong to the original version 601. Next, according to the example, the update process replaces block 604 with block 608, thus the stored version becomes 612. Then the stored version 613 is generated, and finally the stored version becomes the updated version 602. Versions that are partly original and partly updated (e.g., versions 611, 612, 613) are referred to as "intermediate versions".

It should be appreciated that the update process illustrated in FIG. 6 can terminate, normally or not, at any stage. Thus, the stored version stored in the storage device can be any of the versions 601, 611, 612, 613 or 602. Furthermore, since interruption may occur while storing content in an updated block, the last updated block at the point of interruption may be corrupted, that is, it may contain undefined content as is known to those versed in the art.

It should be noted that the example provided with reference to FIG. 6 is by non way binding. Original, intermediate and/or updated versions can include any number of blocks, a block can include any applicable number of bits and the update process can perform any operation applicable to the case apart or in addition to replacing blocks (such as deleting blocks, inserting blocks, moving blocks etc.).

Thus, when an update process initiates, it normally finds a stored version stored in the storage device. The update process should check if the stored version is an original version, an intermediate version, an updated version or an alien version. If the stored version is an updated version, this indicates that the update process had already executed and terminated successfully. If the stored version is an intermediate version this indicates that the update process had already executed but it was interrupted before its successful termination. In those cases that the update process identifies that the stored version is an intermediate version, the identity of the intermediate version can be any one of the versions 611, 612 or 613. In other words, when determining that the update process had operated before using the update package, and realizing that the update process was interrupted before its successful termination, the point of interruption should be determined in order to resume the update process and complete the generation of the updated version.

Returning now to the example of FIG. 5 the update process operates in accordance with the order determined in accordance with the update package 504, in this case it is $F_2, F_4$ and so on. The order in accordance with which the update process operates, i.e., the order dictated by the update package is referred to, hereinafter, as "update sequence". According to one embodiment the update process examines (or scans) the blocks of the stored version in accordance with the update sequence and calculates a signature 506 for each block. The calculated signatures are compared with the packaged signatures 505, wherein each calculated signature 506 is compared with the packaged signature 505 corresponding to the same block. It is noted that while comparing signatures the update process can, for example, check the signatures to see they are bitwise equal.

If the signatures match (being bitwise equal, according to the example), the update process learns that the block is being part of the updated version and thus, the next block in the update sequence can be examined. The first block whose calculated signature 506 does not match the corresponding packaged signature 505 indicates the point of interruption. That is, the update process can resume by updating this block, knowing that the previous block in the update sequence was the last block successfully updated before the process was previously interrupted. In the example of FIG. 5, wherein the update sequence is $F_2, F_4, F_n, F_1, \ldots$, the first block belonging to the stored version in the update sequence is block 507, whose corresponding calculated signature 506 does not match the packaged signature.

It should be noted that signatures used to identify blocks in the stored version ("original signatures" or "old signatures") must be different then signatures used to identify blocks in the updated version ("updated signatures" or "new signatures"), in order for the update process to be able to distinguish between original signatures and updated signatures, while locating the point of interruption. Those versed in the art would appreciate that it is possible to assure the calculation of unique signatures for any given group of one or more blocks having distinct content and/or distinct attributes such as position, for example, by changing slightly the signature calculation method until all signature are different. Therefore, when generating an update package it is required to be familiar with the original version, the updated version and the blocks included therein.

It should be noted that the embodiment described so far with reference to FIG. 5 is not limited. In an alternative embodiment the packaged signatures can correspond to blocks in the original version instead of the updated version. Those versed in the art will appreciate that instead of comparing signatures locating the point of interruption by looking to the first block in the stored version whose signature does not match to the corresponding packaged signature, in this alternative embodiment it is required to look for the first block in the stored version whose signature does match to the corresponding packaged signature, wherein the point of interruption is the previous block in the stored version, according to the update sequence.

Returning to FIG. 5, the update package 504 includes also state records 508. According to the embodiment, each packaged signature 505 has a corresponding state record 508. In the figure, e.g., state record 509 corresponds to packaged signature 510, state record 511 corresponds to packaged signature 512 etc. A state record 508 reflects the state of the update process as it should be after the update of the corresponding block is completed. For example, the state-record can include a copy of the block in RAM used by the update process to hold variables that maintain the process, such as known per se local variables.

In this example, the update process detects that the second block 503 in the update order (a block having block index $F_4$) is the last updated block before interruption occurred. Therefore, the corresponding state-record 511 is used to restore the process state.

Similarly to the packaged signatures, state records 508 can also be stored together with their corresponding blocks. However, alternative embodiments are allowed as well, such as storing signatures in the beginning or end of the update package, in separated tables, together with their corresponding signature or separated from them etc.

Figure 7:
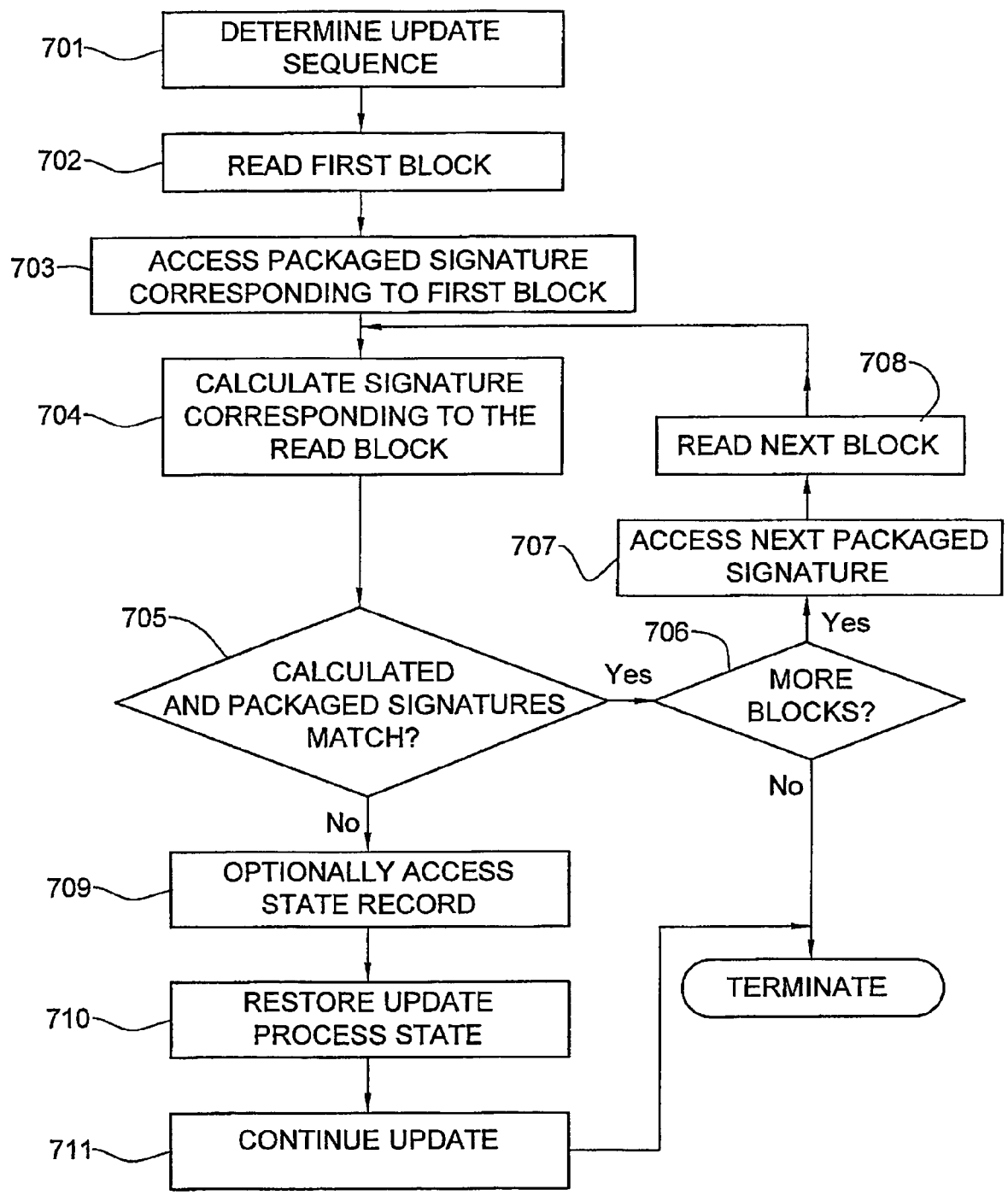
FIG. 7 is a flowchart illustrating operations performed when resuming an update process, according to an embodiment of the invention.

FIG. 7 is a flowchart illustrating operations performed when resuming an update process, according to an embodiment of the invention. In 701 the update sequence is determined in accordance with the update package and in 702 the update process reads the first block of the stored version in accordance with the update sequence. In 703 the packaged signature 505 corresponding to the read block is accessed and the corresponding calculated signature 506 is calculated in 704. If in 705 the update process identifies that the packaged signature and the calculated signature match and as long as there are other, un-examined blocks (see 706), the packaged signature corresponding to the next block in accordance with the update sequence is accessed in 707 and in 708 the block is read in order to calculate its corresponding calculated signature in 704. If in 706 it is found that there are no more un-examined blocks, this means that the stored version is an updated version and the update process terminates.

When in 705 the calculated signature and the packaged signature do not match, the update process can access the state record 508 that corresponds to the read block, as done in 709, in order to restore the process state in 710. Once the state has been restored, the process continues in 711 as if it was never interrupted, updating the stored version to an updated version.

It is noted that according to one example, while updating a block the update process stores the content of the block in a backup buffer to allow restoring its content if the update process fails before the block's update is complete ('backup-first'). When locating the point of interruption it is possible that the content of this block is corrupted. In this case the content can be reverted from the backup buffer. Alternatively, in case of 'update-first', the new content already exists in the backup buffer. In both options, the update process can continue correctly.

In addition, further to the description of FIG. 5, it is noted that FIG. 7 is non-binding too. In an alternative embodiment the packaged signatures can correspond to blocks in the original version instead of the updated version. Those versed in the art will appreciate that instead of comparing signatures locating the point of interruption by looking to the first block in the stored version whose signature does not match to the corresponding packaged signature, in this alternative embodiment it is required to look for the first block in the stored version whose signature does match to the corresponding packaged signature, wherein the point of interruption is the previous block in the stored version, according to the update sequence.

Figure 8:
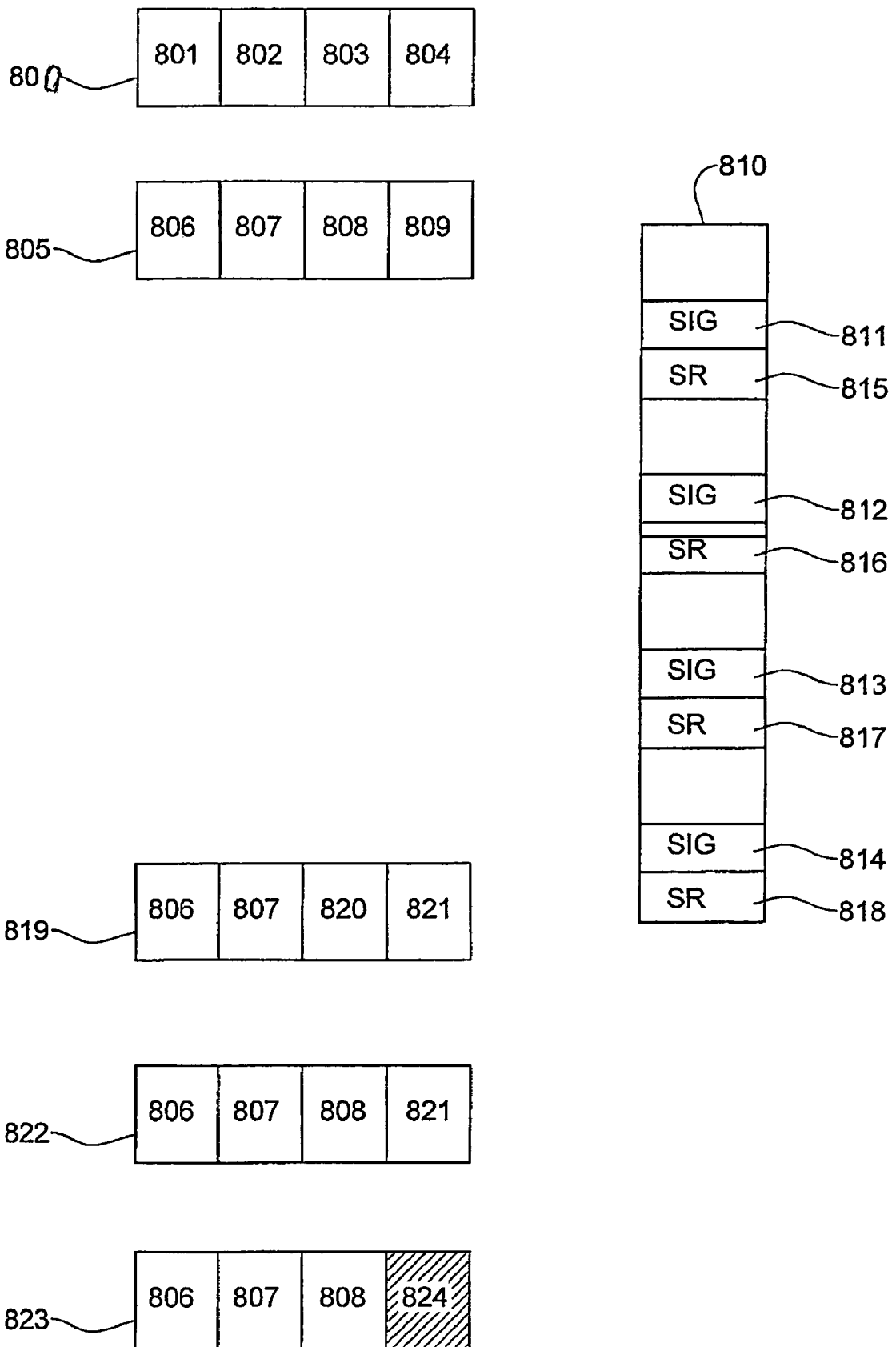
FIG. 8 illustrates by way of example how the method of FIG. 7 erroneously identifies a point of interruption.

It should be appreciated though that in accordance with FIG. 7 the update process can sometimes erroneously identify a point of interruption in 705. FIG. 8 illustrates by way of example how the flowchart of FIG. 7 erroneously identifies a point of interruption. According to the example, 800 is an original version including four blocks: 801, 802, 803 and 804. The version 805 is the updated version received after the update process successfully terminates updating the original version 800. Similarly to the original version 800, the updated version 805 also includes four blocks, namely blocks 806, 807, 808 and 809. While updating the original version 800 to the updated version 805, the update process operate in accordance with an update package 810 adapted thereto. In addition to information required for updating blocks, for each updated block 806, 807, 808 and 809 the update package 810 includes packaged signatures 811, 812, 813 and 814 respectively, and respective state records 815, 816, 817 and 818.

It is appreciated by those versed in the art that after the update process successfully completes updating the original version 800 to the updated version 805, this updated version 805 can be further updated to form another updated version 819. That is, while updating the version 805 to version 819, the previously updated version 805 is referred to as an original version 805. It is appreciated that the updated version 819 can include, for example, blocks whose content is similar to content previously stored in the original updated version 805. This is illustrated in the figure by the updated version 819 that includes blocks 806, 807, 820 and 821. Normally the updated version 819 can be further updated and so on.

It is possible that after updating version 805 to the updated version 819, the update process will start operating again in accordance with the update package 810. This can occur, for example, if the updated package 810 is transmitted in a known per se replay attack. Operating in accordance with the method of FIG. 7, the update process will compare the calculated signature of block 806 with the packaged signature 811 and find a match, then it will compare the calculated signature of block 807 with the packaged signature 812 and again find a match. Further on, the update process will compare the calculated signature of block 820 with the packaged signature 813, and because the signatures do not match it will try to update block 830 to include content similar to block 808. If the update command deletes block 830 and inserts block 808 instead, for example, the update command may succeed, thus generating the stored version 822 in the storage device. It is noted that prima facie, the stored version 822 is an intermediate version.

It is further possible that the update command that generates the content of block 809, according to the example, uses the content of block 804 to calculate the content of block 809. For example, the update command divides a predetermined value provided by the update package 810 by a number stored in block 804 (or part thereof) and stores the result in block 809. According to the example, the number stored in block 804 is not part of block 821. A person versed in the art will appreciate that when trying to update the content of block 821 in accordance with this update command the quotient will not be similar to this received by dividing the predetermined number by the number which is part of block 804. Thus, the update process in this case generates a stored version 823 that includes a block 824, whose content is unpredicted. If 800 and 805 are versions of a computer program, for example, it is appreciated that version 823 is probably a non-functional version thereof. This may cause a device where the program is installed to become non-functional and thus it may become impossible to provide remedy to the situation by transmitting another update package that updates the non-functional version 823 to another version that is operational and/or functional.

It should be noted that the backup buffer in this case includes the content of block 821, while the content of block 820 (previously updated to block 808) is lost. Thus it is also impossible to revert to version 819 in this case.

Even worse, the block 821 can include the value zero therein. Thus, when trying to divide the predetermined value by zero the device may fail operating. Whenever turning the device on the update process will start operating, identify the point of interruption in block 821, read the content of block 821 (including the zero value) from the backup buffer and fail again while performing the division. Thus, it should be appreciated that the method illustrated in FIG. 7 is non reliable.

According to one embodiment of the invention in addition to storing in the update package packaged signatures corresponding to blocks in the updated version, constituting "updated packaged signatures", it is possible to store therein signatures that correspond to blocks in the original version, constituting "original packaged signatures". According to the embodiment, blocks existing in both the original and updated versions (including modified blocks) have an original packaged signature as well as an updated packaged signature. Blocks that exist in the original version but not in the updated version have only an original packaged signature, and blocks that do not exist in the original version but are inserted into the updated version have only a corresponding updated packaged signature.

It is noted that this is non-limiting though and other embodiments may exist, if applicable. For example, according to a different embodiment, if a block in the original version is deleted in accordance with the update package it is possible to have a predetermined value instead of the updated packaged signature. A predetermined value can also be used instead of the original packaged signature, marking the insertion of a new block.

Figure 9:
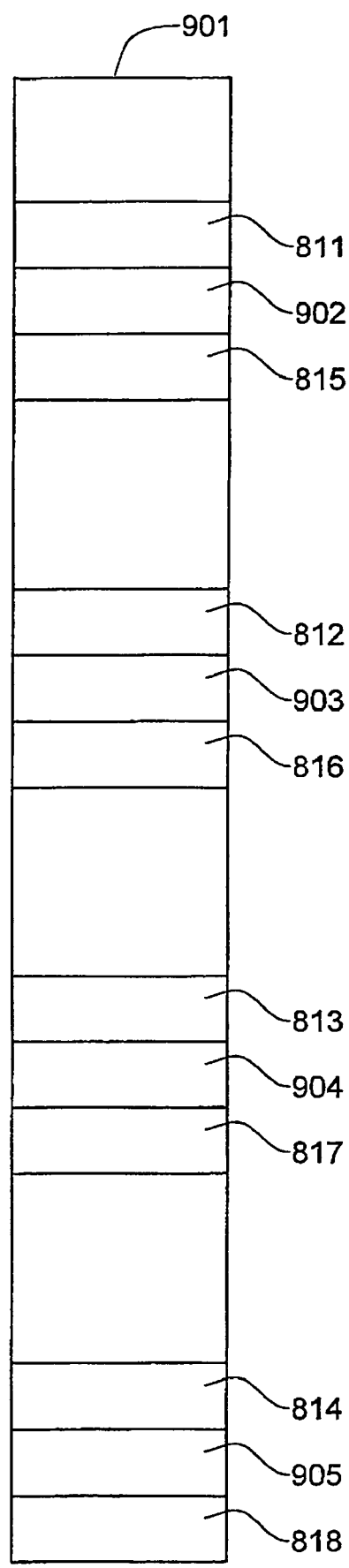
FIG. 9 illustrates an alternative update package for the update package of FIG. 8, in accordance with another embodiment of the invention.

FIG. 9 illustrates an alternative update package 901 for the update package 810 of FIG. 8, in accordance with another embodiment of the invention. In addition to the updated packaged signatures 811, 812, 813 and 814 and the state records 815, 816, 817 and 818, the update package 901 includes also original packaged signatures 902, 903, 904 and 905.

The order by which an updated packaged signature, an original packaged signature and their corresponding state record appear in FIG. 9 is non-binding. The invention does not require that an original packaged signature further followed by a corresponding state record will follow a corresponding updated packaged signature. Furthermore, according to the illustrated embodiment updated packaged signatures, original packaged signatures and state records are stored together with their corresponding blocks. However, alternative embodiments are allowed as well, such as storing updated packaged signatures or part thereof, and/or original packaged signatures or part thereof, and/or state records or part thereof in separated tables, in the beginning or end of the update package etc.

Having original and updated packaged signatures in association with the update package allows checking whether the stored version is the original version, an intermediate version derived therefrom, the updated version or an alien version. In other words, the original and updated packaged signatures allow version classification.

Figure 10:
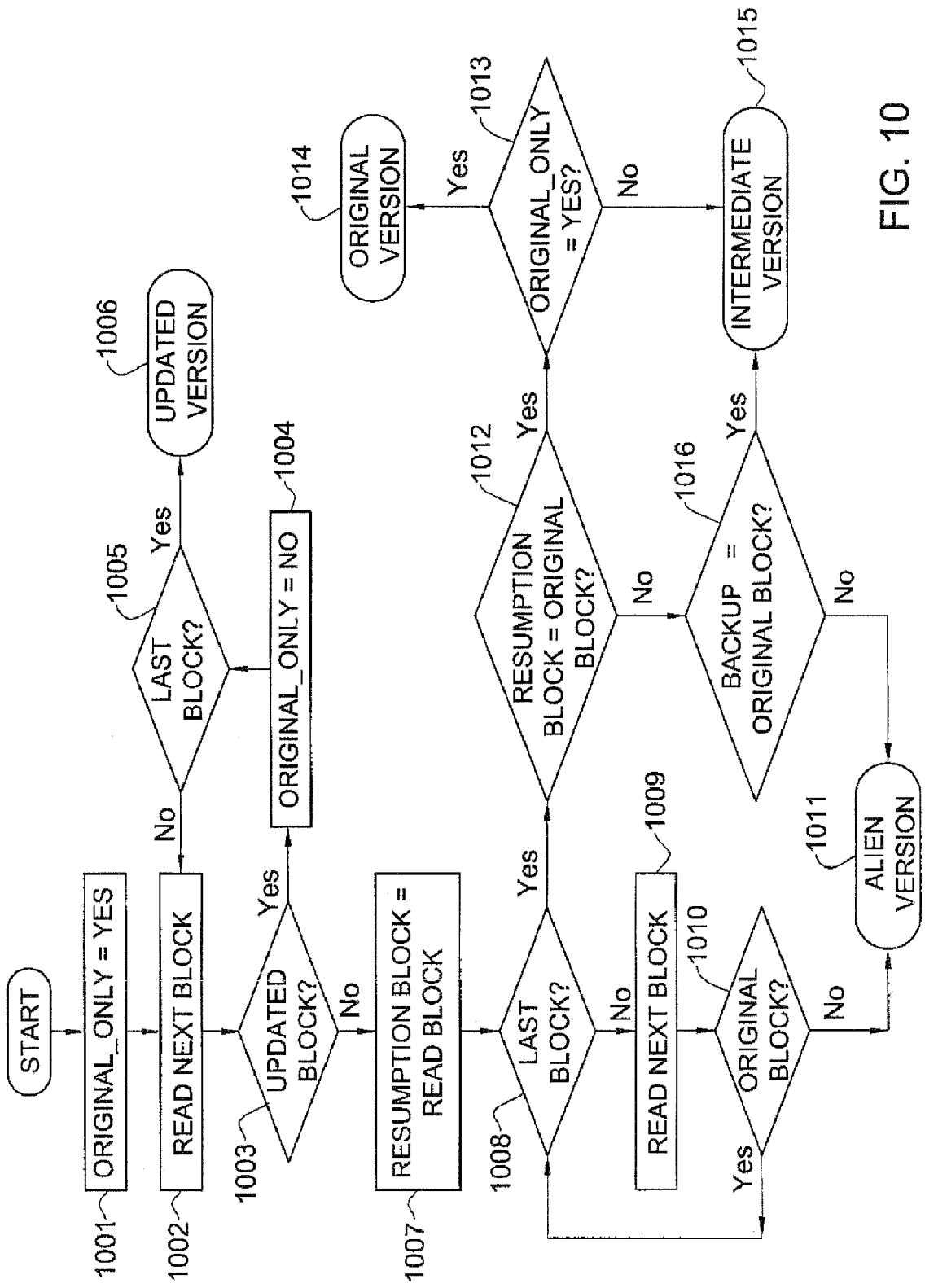
FIG. 10 is a flowchart illustrating version classification, according to an embodiment of the invention.

FIG. 10 is a flowchart illustrating version classification, according to an embodiment of the invention. It is noted that the flowchart operates in accordance with the update sequence, that is, blocks are read from the stored version in accordance with the update sequence. In 1001 parameters are initialized. According to the embodiment, there is at least one required parameter used to indicate if the stored version includes only original blocks (i.e., blocks whose content belongs to the original version). It should be appreciated that before start it is assumed that the stored version is an original version, i.e., all the blocks included therein are original blocks, and therefore the "original only" flag is assigned the value "yes".

It should be appreciated that an original version includes only original blocks, an updated version includes only updated blocks, while an intermediate version can include a prefix of updated blocks and/or a suffix of original blocks and possibly also a corrupted block whose original content is stored in the backup storage. Returning now to the flowchart of FIG. 10 while understanding this, it should be appreciated that 1002, 1003, 1004 and 1005 are followed to read the updated blocks' prefix, if exists.

It is noted that in 1003, according to one embodiment of the invention, the calculated signature of the read block is compared with the updated packaged signature of the block in order to determine whether it is or is not an updated block. In addition, if in 1005 the version's last block is reached, the updated prefix is found to be the whole version, and thus the version is determined to be an updated version (1006).

Returning to 1003, when the read block is determined to be different than an updated block, it is appreciated that it can be either an original block, an alien block or a corrupted block. If the read block is either original or corrupted, the update process needs to resume operation therefrom, trying to update this block to a corresponding updated block. Therefore, 1007 stores an indication to the block's identification, e.g., the block's index. This block constitutes a resumption block.

Yet, it should be appreciated that an intermediate version can include a suffix of zero or more blocks that follow the resumption block, wherein all the blocks included in the suffix must be original blocks, as verified by 1008, 1009 and 1010. If in 1010 one of the blocks included in the suffix is determined not to be an original block, 1011 determines that the stored version is an alien version.

After checking all the blocks included in the version (in 1002, 1003, 1004, 1005 and in 1008, 1009, 1010), the resumption block is checked in 1012 in order to determine whether it is an original block, which means that a previous update package has failed immediately after updating the previous block and before modifying the resumption block. It should be appreciated that if the stored version includes only original blocks (e.g., as indicated in 1013 by the original_only flag) this is an original version (see 1014). Otherwise the version is an intermediate version (see 1015).

However, if in 1012 it is determined that the resumption block is not an original block, it can be a corrupted block (wherein the backup buffer should include a copy of the original block) or an alien block. Therefore, 1016 compares the content of the backup buffer with the content corresponding to the original block (e.g., by calculating a signature for the content of the backup buffer and comparing the calculated signature with the packaged signature corresponding to the original block), and if the backup buffer includes a copy of the original block the stored version is determined on 1015 to be an intermediate version. However, if the backup buffer does not include a copy of the original block then this means that the resumption block is an alien block, thus in 1011 the version is determined to be an alien version.

It should be noted that the flowchart of FIG. 10 is non-binding and different embodiments may be used if applicable. For example, recursive algorithm can be used instead, other flags can be in use, it is possible to perform several of the mentioned procedures in a different order etc.

Before continuing with describing further embodiments of the invention, it should be noted that the embodiment of FIG. 10 compares signatures of blocks in the stored version with signatures of blocks stored in association with the update package in order to determine whether the stored version is an original version, an intermediate version, an updated version or an alien version. In other words, the embodiment of FIG. 10 allows classification of stored versions stored in storage devices by determining whether the stored versions are an original version, an intermediate version, an updated version or an alien version.

It was illustrated before, with reference to FIG. 8, how an alien version is determined in a destructive manner. The version 819 is an alien version to the update package 810, yet, it was determined as such just after updating block 820 and trying to update block 821, thus destructing the stored package 819. It should be appreciated that the embodiment illustrated in FIG. 10 allows determining in a non destructive manner that a stored version is an alien version.

When determining that a version is an alien version an indication is sometimes provided. Such an indication, if transmitted for example to the cellular supplier, can indicate that an attack (such as a replay attack) possibly occurs in the network. Alternatively, the indication is used by the update process itself in order to avoid updating any content following the determination that a stored version is an alien version.

Only in those cases that the stored version is determined to be an original version or an intermediate version, the update process updates the determined original version or the determined intermediate version to the updated version.

In addition it should also be appreciated that signatures can be calculated not only for single blocks, but also for several blocks, including whole versions. In other words, signatures can be calculated for one or more blocks. Therefore it is possible to calculate a signature for the original version and another signature for the updated version, storing them in association with the update package, therefore constituting, respectively, an "original version packaged signature" and an "updated version packaged signature". Furthermore, it is possible to calculate a signature for a stored version.

Thus, another embodiment of the invention compares the calculated signature of the stored version with the original version packaged signature and/or with the updated version packaged signature in order to determine whether the stored version is an original version or an updated version. Only upon determining that the stored version is neither an original version nor an updated version this embodiment can follow the flowchart of FIG. 10 in order to determine whether it is an intermediate version or an alien version.

It should be appreciated that if the stored version is an original version then the resume location (or in other words, the resumption block) is the first block in the stored version, in accordance with the update sequence.

One way for searching the resume location in an intermediate version is comparing signatures of sections of the intermediate version with signatures packaged in the update package. An intermediate version must begin with blocks including content belonging to the updated version, or with a corrupted block in the first block of the stored version according to the update sequence, wherein the content belonging to the original block is stored in the backup buffer. The blocks belonging to the updated version (if any) are considered as the prefix of the intermediate version. Thus the prefix of the intermediate version can include zero or more blocks, but not more than the number of blocks included in the updated version.

In addition, an intermediate version must terminate with blocks belonging to the original version, or with a corrupted block in the last block wherein the content belonging to the original block is stored in the backup buffer. The blocks belonging to the original version, if any, are considered as the suffix of the intermediate version. Thus the suffix of the intermediate version can include zero or more blocks, but not more than the number of blocks included in the original version.

By having stored in association with the update package signatures of possible prefixes and suffixes it is possible to match these signatures with prefixes and suffixes of the stored version, thus searching for the resume location.

In accordance with some embodiments of the invention, it is possible to break up the classification from finding the resume location. Given the classification of the stored version, if the stored version is determined to be an intermediate version, the update process can search for the resume location in order to update the stored version to the updated version.

Therefore, according to some embodiments, after classifying the stored version, the update process can store an indication for the classification results in a status indication, for indicating whether the stored version is the original version, an intermediate version, the updated version or an alien version. If the version is an original version then substantially immediately after backing up the first block, the update process can change the status indication for indicating that the stored version is an intermediate version. Similarly, after terminating the update successfully, the update process can change the status indication for indicating that the stored version is an updated version. If the update process then resumes, it can check the status indication instead of checking using signature matching, which is faster. According to some embodiments, it is possible to store in association with the status indication also signatures of the original and updated versions, allowing full identification and classification of the stored version in correspondence with the update package.

Figure 11A:
FIG. 11A illustrates, by way of example, a status indication stored in association with a stored version, according to one embodiment of the invention.
Figure 11A:
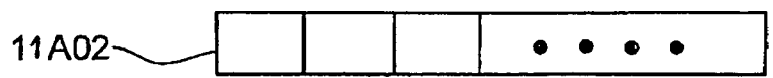

FIG. 11A illustrates, by way of example, a status indication 11A01 stored in association with a stored version 11A02, according to one embodiment of the invention. According to this embodiment, the status indication 11A01 is not part of the stored version 11A02, it is external thereto. For example, it can be stored in a separate memory space, which can be in part of the update package or external to it.

Figure 11B:
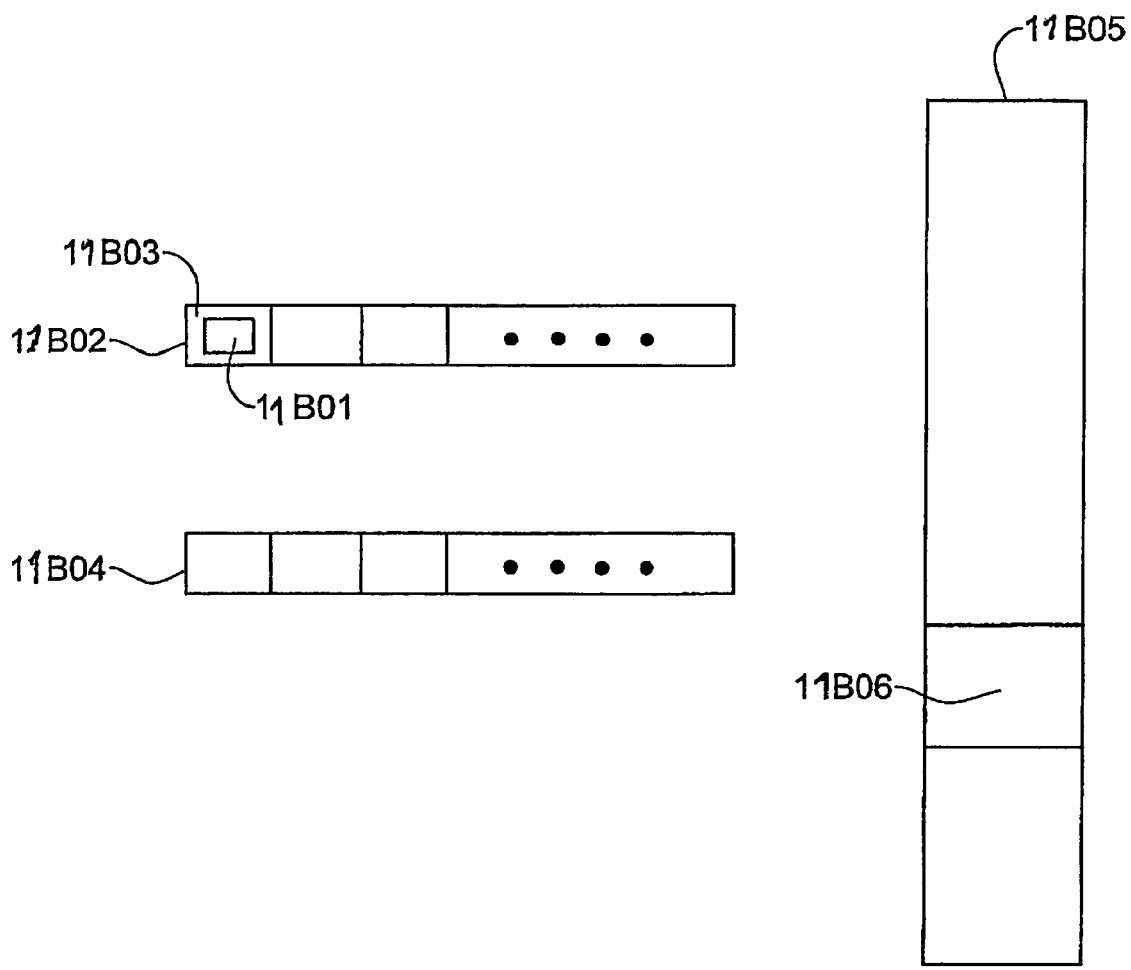
FIG. 11B illustrates, by way of example, a status indication stored in association with a stored version, according to a different embodiment of the invention.

Alternatively, FIG. 11B illustrates, by way of example, a status indication 11B01 stored in association with a stored version 11B02, according to a different embodiment of the invention. According to this embodiment the status indication 11B01 is stored in-place, that is, it is stored in one or more blocks of the stored version 11B02. In the figure the status indication is stored in block 11B03. The blocks, or blocks, where the status indication is stored are referred to as "hosting blocks".

It should be realized that the status indication is probably not part of the original and/or updated versions. While storing the status indication in the hosting blocks, content being part thereof is deleted in favor of the status indication. Therefore, before successfully terminating the update process it is required to delete the status indication, inserting content instead. In the figure, 11B04 is the updated content after recovering the hosting blocks.

In order to recover the hosting blocks, according to one embodiment of the invention, the content of the hosting blocks, or at least the content whose place was taken by the status indication can be stored in the update package, constituting "recovery content". It is noted that in some applications the recovery content itself is stored in the update package, while in other applications the recovery content is generated in accordance with "recovery commands" stored in the update package. Generally, the term "recovery command" is used, hereinafter, while referring to content or commands stored in the update package, used to recover hosting blocks. In FIG. 11B an update package 11B05 is illustrated, including a recovery command 11B06 used for recovering the hosting block 11B01.

It should be noted that FIG. 11B is non-limiting. The hosting block is not required to be in the first block of the stored version and the recovery command can be stored anywhere in the update package. For example, the hosting block can be in the end of the last block of the stored version (in accordance with the update sequence). This way, when finally updating the last block in the update process, the status indication is implicitly replaced by the block's content being part of the updated version, wherein it is not required to explicitly recover the hosting block.

It is noted that during recovery, whether implicit or explicit, the status indication is stored in a backup buffer, thus allowing to resume the update process if it fails during recovery.

Finally, it is also possible to store in the status indication an index referring to the currently updated blocks. This way, when resuming the update process, if the stored version includes a status indication this indicates that the stored version is an intermediate version, wherein the status indication includes an index directing the update process to the resume location.

Figure 12:
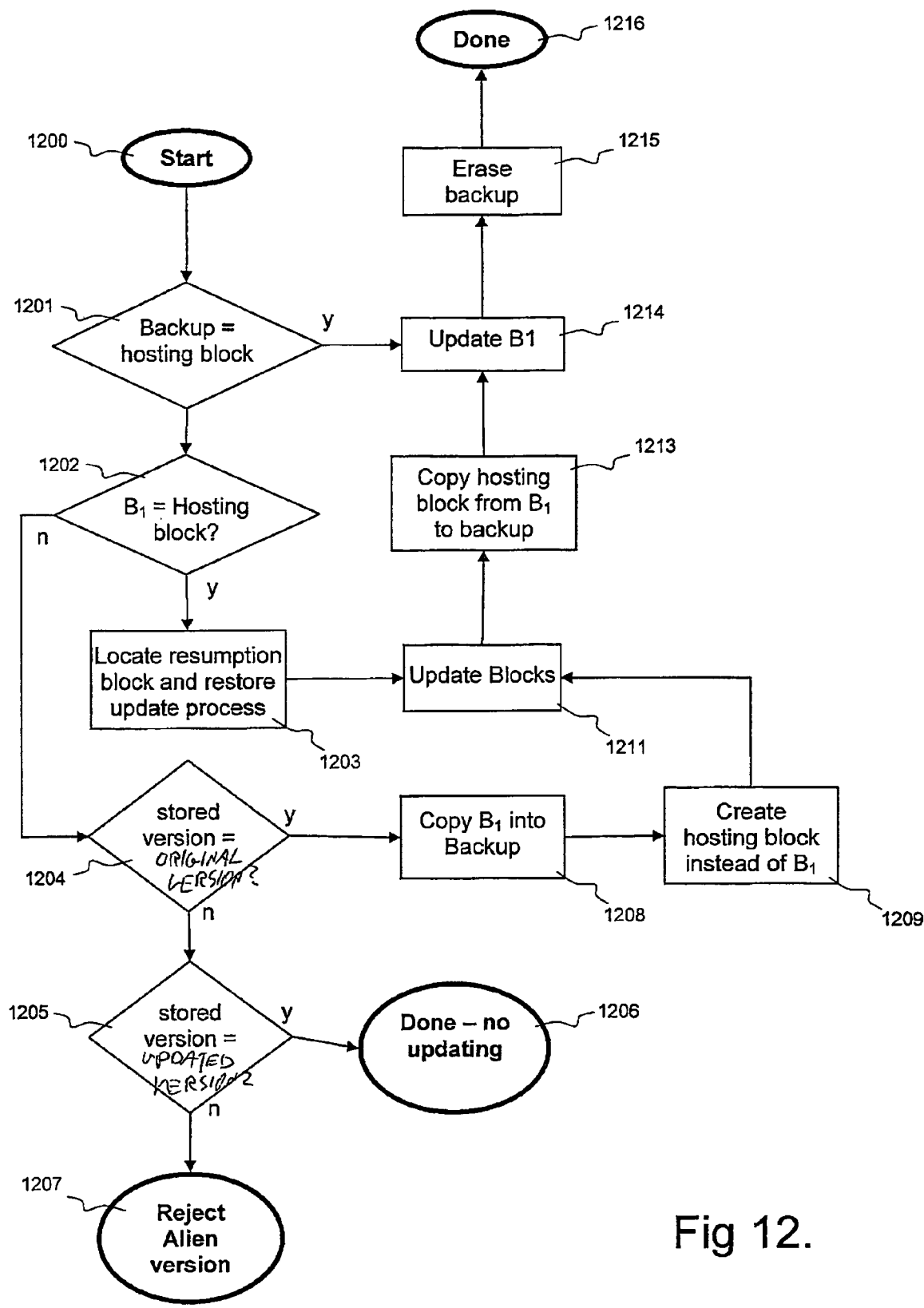
FIG. 12 is a flowchart illustrating how to resume an update process, in accordance with one embodiment of the invention.

In FIG. 12 another embodiment shows how the update process can reliably resume after being interrupted. In this example, an in-place status indication is stored in a hosting block, as described by FIG. 11B, which in this embodiment is the first updated block hereinafter called "$B_1$". In 1202, $B_1$ is checked to see if it properly contains a status indication. Knowing that according to the embodiment original and updated versions do not include status indications, the update process can safely conclude that the stored version is an intermediate one. If it is an intermediate version, the resumption block is located in 1203 in a way such as shown by FIG. 10 and the update process is restored after which it can safely continue in 1211. If no such status indication is found, it is possible that the version is either an original version, updated version or an alien version. In 1204 the version is checked in any applicable way (such as the method illustrated in FIG. 10) to see if it is the original version. If it is not the original version, the version is checked in 1205 to see if it is the updated version. If the version is an updated version, there is no need to apply the update and the process can stop at 1205. If the version is neither updated, nor intermediate nor original, it is an alien and the process stops at 1207. If the version is original, $B_1$ has to be modified to contain the indication. The action of modifying $B_1$ modifies the stored version into an intermediate version. For maintaining reliability $B_1$ is first copied to backup storage in 1208 and than, in 1209, it is converted to a proper hosting block containing the indication. The update process continues is 1211 to update the 2'nd block and so on until all blocks that require update are updated. After blocks have all been updated, except for $B_1$, which is the modified hosting block, the update package, which is adapted to update the modified $B_1$ instead of the original $B_1$, is used to update $B_1$ turning it into an updated block. In order to make the update reliable, the content of the hosting block is copied from $B_1$ to the backup storage in 1213 and in 1214 is updated by using the update package to contain its updated content. In case the process is interrupted in 1213 wherein $B_1$ may be corrupted, this special case is distinguished, when process is resuming at 1201 and in which case the update process resumes directly to 1214. In order to terminate the process and not resume uselessly to 1214, the backup is erased in 1215 and the process terminates in 1216, leaving an updated version, without a status indication and without a special state, so at next process activation, it will stop at 1206.

It will also be understood that the system according to the invention may be a suitably programmed computer. Likewise, the invention contemplates a computer program being readable by a computer for executing the method of the invention. In particular, the invention contemplates a computer program product comprising a computer useable medium having computer readable program code embodied therein for updating a store version of content stored in a storage device to an updated version using an updated package, wherein the updated package is adapted for updating an original version of content to the updated version and wherein the updating is carried out in accordance with an updated sequence, the computer program product comprising computer readable program code for causing the computer to determine whether the stored version is the original version and if so updating said stored version to said updated version using the updated package, otherwise, determining, while using an in-place status indication stored in one or more hosting blocks of the stored version, whether the stored version is an intermediate version derived from the original version and if so, searching for a resume location in said stored version, updating said stored version to said updated version starting from the resume location, using the updated package and recovering the one or more hosting blocks to include content being part of the updated version. The invention further contemplates a computer program product comprising a computer useable medium having computer readable program code embodied therein for classifying a stored version of content stored in a storage device, the computer program product comprising computer readable program code for causing the computer to determine whether the content is classified as one of the following: an intermediate version and an alien version, wherein determining uses only blocks used for storing data being part of the stored version, blocks being part of a backup buffer and the updated package. The invention further contemplates a computer program product comprising a computer useable medium having computer readable program code embodied therein for reliably updating a store version of content stored in a storage device to an updated version using an updated package, computer program product comprising, computer readable program code for causing the computer to check an in-place status indication for indicating whether the updated package corresponds to the store version and if so, to search for a resume location in said stored version and to update said stored version to said updated version starting from the resume location. The invention further contemplates a machine-readable memory tangibly embodying a program of instructions executable by the machine for executing the method of the invention.

The invention claimed is:

1. A method of updating a stored version of content stored in a storage device to an updated version using an update package, wherein the update package is adapted to update an original version of content to the updated version and wherein the updating of blocks is carried out in accordance with an update sequence of blocks, the method comprising:

determining whether the stored version is the original version, and if so, updating said stored version to said updated version using the update package;

otherwise, determining, while using an in-place status indication indicative of the stored version classification as one of an original version, an updated version, an intermediate version and an alien version, and stored in one or more hosting blocks of the stored version, whether the stored version is an intermediate version derived from the original version and if so, searching for a resume location in said stored version, updating said stored version to said updated version starting from the resume location using the update package and recovering the one or more hosting blocks to include content being part of the updated version, wherein an original version comprises a set of original blocks;

wherein an updated version comprises a set of undated blocks, all of which were original blocks that required updating;

wherein an intermediate version comprises an ordered set of all original blocks having a beginning block, an intermediate block and an end block, wherein all the blocks between the beginning block and the intermediate block, including the intermediate block that have required updating are updated blocks and wherein all the blocks between the intermediate block and the ending block are original blocks;

wherein an alien version is neither an original version, an updated nor an intermediate version; and wherein the resume location in case the determined version is an intermediate version is the intermediate block.

2. The method of claim 1, wherein upon determining that said stored version is neither the original version nor an intermediate version derived therefrom, the method further comprising:

determining if the stored version is an alien version that cannot be updated in accordance with the update package, and if so, providing an appropriate indication.

3. The method of claim 2, wherein upon determining that the stored version is an alien version the method further comprising:

refraining further updating the stored version to the updated version.

4. The method of claim 1, wherein determining whether the stored version is the original version includes:

calculating signatures for blocks in the stored version; and
comparing calculated signatures with signatures of blocks stored in association with the update package.

5. A method of classifying a stored version of content stored in a storage device, the classifying corresponding to an update package and an update sequence of blocks, the method comprising:

determining whether the content is classified as one of: an original version, an updated version, an intermediate version, or an alien version that cannot be updated in accordance with the update package;

wherein an original version comprises a set or ordered blocks, all of which are original blocks;

wherein an updated version comprises a set of ordered blocks, all of which that required updating, are updated blocks;

wherein an intermediate version comprises a set of ordered blocks having a beginning block, an intermediate block and an end block, wherein all the blocks between the beginning block and the intermediate block, including the intermediate block, that have required updating are updated blocks and wherein all the blocks between the intermediate block and the ending block are original blocks;

wherein an alien version is neither an original version, an updated nor an intermediate version; and wherein the determining uses only blocks used for storing data being part of the stored version, blocks being part of a backup buffer and the update package.

6. A method for reliably updating a stored version of content stored in a storage device to an updated version using an update package, the method comprising:

checking an in-place status indication indicative of the stored version classification as one of an original version, an updated version, an intermediate version and an alien version, for indicating whether the update package corresponds to the stored version and if so, searching for a resume location in said stored version and updating said stored version to said updated version starting from the resume location, wherein an original version comprises a set of ordered blocks, all of which are original blocks;

wherein an updated version comprises a set of ordered blocks, all of which that required updating, are updated blocks;

wherein an intermediate version comprises a set of ordered blocks having a beginning block, an intermediate block and an end block, wherein all the blocks between the beginning block and the intermediate block, including the intermediate block, that have required updating are updated blocks and wherein all the blocks between the intermediate block and the ending block are original blocks;

wherein an alien version is neither an original version, an updated nor an intermediate version;

and wherein the resume location in case the determined version is an intermediate version is the intermediate block.

7. An embedded device for updating a stored version of content stored in a storage device to an updated version using an update package, wherein the update package is adapted for updating an original version of content to the updated version and wherein the updating is carried out in accordance with an update sequence, the device comprising:

an original version determining unit embedded on at least one of the computer and the machine-readable memory configured to determine whether the stored version is the original version;

an intermediate version determining unit embedded on at least one of the computer and the machine-readable memory configured to determine, while using an in-place status indication indicative of the stored version classification as one of an original version, an updated version, an intermediate version and an alien version, and stored in one or more hosting blocks of the stored version, whether the stored version is an intermediate version derived from the original version;

a searching unit embedded on at least one of the computer and the machine-readable memory configured to search for a resume location in said stored version; and an updating unit embedded on at least one of the computer and the machine-readable memory configured to update said stored version to said updated version starting from the resume location using the update package, the updating unit is configured to recover the one or more hosting blocks to include content being part of the updated version, wherein an original version comprises a set of ordered blocks, all of which are original blocks;

wherein an updated version comprises a set of ordered blocks, all of which that required updating, are updated blocks;

wherein an intermediate version comprises a set of ordered blocks having a beginning block, an intermediate block and an end block, wherein all the blocks between the beginning block and the intermediate block, including the intermediate block that have required updating are updated blocks and wherein all the blocks between the intermediate block and the ending block are original blocks;

wherein an alien version is neither an original version, an updated nor an intermediate version; and wherein the resume location in case the determined version is an intermediate version is the intermediate block.

8. The device of claim 7, further comprising:
an alien version determining unit embedded on at least one of the computer and the machine-readable memory configured to determine whether the stored version is an alien version that cannot be updated in accordance with the update package and if so provide an alien indication; and
an output module embedded on at least one of the computer and the machine-readable memory coupled to said alien version determining unit, configured to provide an appropriate indication upon receiving an alien indication indicative that the stored version is an alien version.

9. The device of claim 8, wherein the updating unit is configured to refrain from updating the stored version to the updated version upon receiving the alien indication.

10. The device of claim 7, wherein the original version determining unit includes:
a calculator embedded on at least one of the computer and the machine-readable memory configured to calculate signatures for blocks in the stored version; and
a comparison unit embedded on at least one of the computer and the machine-readable memory configured to compare calculated signatures with signatures of blocks stored in association with the update package.

11. An apparatus for classifying a stored version of content stored in a storage device, the classifying corresponding to an update package, the apparatus comprising:
a processor configured to determine whether the content is classified as one of: an original version, an update version, an intermediate version, or an alien version that cannot be updated in accordance with the update package;
wherein an original version comprises a set of ordered blocks, all of which are original blocks;
wherein an updated version comprises a set of ordered blocks, all of which that required updating are updated blocks;
wherein an intermediate version comprises a set of ordered blocks having a beginning block, an intermediate block and an end block, wherein all the blocks between the beginning block and the intermediate block, including the intermediate block that have required updating are updated blocks and wherein all the blocks between the intermediate block and the ending block are original blocks;
wherein an alien version is neither an original version, an updated nor an intermediate version;
wherein the resume location in case the determined version is an intermediate version is the intermediate block; and
wherein the processor is configured to use only blocks used for storing data being part of the stored version, blocks being part of a backup buffer the update package for determining classification.

12. A program storage device readable by machine, tangibly storing a program of instructions executable by the machine to perform method for updating a stored version of content stored in a storage device to an updated version using an update package, wherein the update package is adapted for updating an original version of content to the updated version and wherein the updating is carried out in accordance with an update sequence, the method comprising:
determining whether the stored version is the original version and if so updating said stored version to said updated version using the update package;
otherwise, determining, while using an in-place status indication indicative of the stored version classification as one of an original version, an updated version, an intermediate version and an alien version, and stored in one or more hosting blocks of the stored version, whether the stored version is an intermediate version derived from the original version and if so, searching for a resume location in said stored version, updating said stored version to said updated version starting from the resume location, using the update package and recovering the one or more hosting blocks to include content being part of the updated version,
wherein an original version comprises a set of ordered blocks, all of which are original blocks;
wherein an updated version comprises a set of ordered blocks, all of which that required updating, are updated blocks;
wherein an intermediate version comprises a set of ordered blocks having a beginning block, an intermediate block and an end block, wherein all the blocks between the beginning block and the intermediate block, including the intermediate block are that have required updating updated blocks and wherein all the blocks between the intermediate block and the ending block are original blocks;
wherein an alien version is neither an original version, an updated nor an intermediate version;
and wherein the resume location in case the determined version is an intermediate version is the intermediate block.

13. A computer program product comprising a machine-readable memory having computer readable program code stored therein for updating a stored version of content stored in a storage device to an updated version using an update package, wherein the update package is adapted for updating an original version of content to the updated version and wherein the updating is carried out in accordance with an update sequence, the computer program product comprising:
computer readable program code for causing the computer to determine whether the stored version is the original version and if so updating said stored version to said updated version using the update package;
otherwise, determining, while using an in-place status indication indicative of the stored version classification as one of an original version, an updated version, an intermediate version and an alien version, and stored in one or more hosting blocks of the stored version, whether the stored version is an intermediate version derived from the original version and if so, searching for a resume location in said stored version, updating said stored version to said updated version starting from the resume location, using the update package and recovering the one or more hosting blocks to include content being part of the updated version,
wherein an original version comprises a set of ordered blocks, all of which are original blocks;
wherein an updated version comprises a set of ordered blocks, all of which that required updating, are updated blocks;
wherein an intermediate version comprises a set of ordered blocks having a beginning block, an intermediate block and an end block, wherein all the blocks between the beginning block and the intermediate block, including the intermediate block that have required updating are updated blocks and wherein all the blocks between the intermediate block and the ending block are original blocks;
wherein an alien version is neither an original version, an updated nor an intermediate version; and wherein the resume location in case the determined version is an intermediate version is the intermediate block.

14. A program storage device readable by machine, tangibly storing a program of instructions executable by the machine to perform method for classifying a stored version of content stored in a storage device, the classifying corresponding to an update package, the method comprising:
  determining whether the content is classified as one of: an original version, an updated version, an intermediate version, or an alien version that cannot be updated in accordance with the update package;
  wherein an original version comprises a set of ordered blocks, all of which are original blocks;
  wherein an updated version comprises a set of ordered blocks, all of which that required updating, are updated blocks;
  wherein an intermediate version comprises a set of ordered blocks having a beginning block, an intermediate block and an end block, wherein all the blocks between the beginning block and the intermediate block, including the intermediate block that have required updating are updated blocks and wherein all the blocks between the intermediate block and the ending block are original blocks;
  wherein an alien version is neither an original version, an updated nor an intermediate version;
  wherein the resume location in case the determined version is an intermediate version is the intermediate block; and
  wherein determining uses only blocks used for storing data being part of the stored version, blocks being part of a backup buffer and the update package.

15. A computer program product comprising a machine-readable memory having computer readable program code stored therein for classifying a stored version of content stored in a storage device, the classifying corresponding to an update package, the computer program product comprising:
  computer readable program code for causing the computer to determine whether the content is classified as one of: an original version, an update version, an intermediate version, or an alien version that cannot be updated in accordance with the update package;
  wherein an original version comprises a set of ordered blocks, all of which are original blocks;
  wherein an updated version comprises a set of ordered blocks, all of which that required updating, are updated blocks;
  wherein an intermediate version comprises a set of ordered blocks having a beginning block, an intermediate block and an end block, wherein all the blocks between the beginning block and the intermediate block, including the intermediate block that have required updating are updated blocks and wherein all the blocks between the intermediate block and the ending block are original blocks;
  wherein an alien version is neither an original version, an updated nor an intermediate version;
  wherein the resume location in case the determined version is an intermediate version is the intermediate block; and
  wherein determining uses only blocks used for storing data being part of the stored version, blocks being part of a backup buffer and the update package.

16. A program storage device readable by machine, tangibly storing a program of instructions executable by the machine to perform method for reliably updating a stored version of content stored in a storage device to an updated version using an update package, the method comprising:
  checking an in-place status indication indicative of the stored version classification as one of an original version, an updated version, an intermediate version and an alien version, for indicating whether the update package corresponds to the stored version and if so, searching for a resume location in said stored version and updating said stored version to said updated version starting from the resume location,
  wherein an original version comprises a set of ordered blocks, all of which are original blocks;
  wherein an updated version comprises a set of ordered blocks, all of which that required updating, are updated blocks;
  wherein an intermediate version comprises a set of ordered blocks having a beginning block, an intermediate block and an end block, wherein all the blocks between the beginning block and the intermediate block, including the intermediate block that have required updating are updated blocks and wherein all the blocks between the intermediate block and the ending block are original blocks;
  wherein an alien version is neither an original version, an updated nor an intermediate version; and
  wherein the resume location in case the determined version is an intermediate version is the intermediate block.

17. A computer program product comprising a machine-readable memory having computer readable program code stored therein for reliably updating a stored version of content stored in a storage device to an updated version using an update package, the computer program product comprising:
  computer readable program code for causing the computer to check an in-place status indication indicative of the stored version classification as one of an original version, an updated version, an intermediate version and an alien version, for indicating whether the update package corresponds to the stored version and if so, to search for a resume location in said stored version and to update said stored version to said updated version starting from the resume location,
  wherein an original version comprises a set of ordered blocks, all of which are original blocks;
  wherein an updated version comprises a set of ordered blocks, all of which that required updating, are updated blocks;
  wherein an intermediate version comprises a set of ordered blocks having a beginning block, an intermediate block and an end block, wherein all the blocks between the beginning block and the intermediate block, including the intermediate block, that have required updating are updated blocks and wherein all the blocks between the intermediate block and the ending block are original blocks;
  wherein an alien version is neither an original version, an updated nor an intermediate version; and
  wherein the resume location in case the determined version is an intermediate version is the intermediate block.

18. An embedded device for reliably updating a stored version of content stored in a storage device to an updated version using an update package, the device comprising:
  a status checking unit embedded on at least one of the computer and the machine-readable memory configured to check an in-place status indication indicative of the stored version classification as one of an original version, an updated version, an intermediate version and an alien version, for determining whether the update package corresponds to the stored version, and if so provide a correspondence indication;

wherein an original version comprises a set of ordered blocks, all of which are original blocks;

wherein an updated version comprises a set of ordered blocks, all of which that required updating, are updated blocks;

wherein an intermediate version comprises a set of ordered blocks having a beginning block, an intermediate block and an end block, wherein all the blocks between the beginning block and the intermediate block, including the intermediate block that have required updating are updated blocks and wherein all the blocks between the intermediate block and the ending block are original blocks; and wherein an alien version is neither an original version, an updated nor an intermediate version;

a searching unit embedded on at least one of the computer and the machine-readable memory coupled to said status checking unit, configured to search for a resume location in said stored version upon receiving the correspondence indication; and an updating unit embedded on at least one of the computer and the machine-readable memory coupled to said status checking unit and said searching unit, the updating unit is configured to update said stored version to said updated version starting from the resume location upon receiving the correspondence indication; and wherein the resume location in case the determined version is an intermediate version is the intermediate block.

19. A method of updating a stored version of content stored on a storage device to an updated version using an update package, wherein the update package is adapted to update an original version of content to the updated version in accordance with an update sequence of blocks, the method comprising:

reading the stored version block by block in accordance with the update sequence; determining if each read block is either an original or an updated block;

if a particular block is neither original nor updated, determining the particular block as a corrupted block if updated content of the particular block is obtainable using a backup buffer;

determining the stored version as an original version, if the stored version comprises a set of all original blocks;

determining the stored version as an updated version, if the stored version comprises a set of all original blocks, all of which that have required updating are updated blocks;

determining the stored version as an intermediate version, if the stored version comprises an ordered set of all original blocks having a beginning block, an intermediate block and an end block, wherein all the blocks between the beginning block and the intermediate block, including the intermediate block, that have required updating, are updated blocks except the intermediate block and wherein all the blocks between the intermediate block and the ending block are original blocks;

determining the stored version as an alien version if the stored version is not at least one of: an original version, an updated version, an intermediate version, contain a corrupted block;

updating said stored version to said updated version, starting from a resume location wherein the resume location is the intermediate block, if the determined stored version is an intermediate version; and providing an indication if the determined stored version is an alien version.

\* \* \* \* \*